(12) United States Patent
Xu et al.

(10) Patent No.: US 10,024,759 B1
(45) Date of Patent: Jul. 17, 2018

(54) THREE-IN-ONE TESTING MACHINE FOR A CODED LUGGAGE LOCK

(71) Applicant: Dongguan Jingyu Industrial Co., Ltd., Dongguan (CN)

(72) Inventors: Zheng Xu, Dongguan (CN); Xiangshou Zeng, Dongguan (CN); Maotian He, Dongguan (CN)

(73) Assignee: Dongguan Jingyu Industrial Co., Ltd., Dongguan (CN)

( * ) Notice: Subject to any disclaimer, the term of this patent is extended or adjusted under 35 U.S.C. 154(b) by 0 days.

(21) Appl. No.: 15/578,875

(22) PCT Filed: Mar. 13, 2015

(86) PCT No.: PCT/CN2015/074168
§ 371 (c)(1),
(2) Date: Dec. 1, 2017

(87) PCT Pub. No.: WO2016/106974
PCT Pub. Date: Jul. 7, 2016

(30) Foreign Application Priority Data

Dec. 31, 2014 (CN) .......................... 2014 1 0855054

(51) Int. Cl.
*G01M 13/00* (2006.01)
*E05B 65/52* (2006.01)
*E05B 37/00* (2006.01)

(52) U.S. Cl.
CPC ......... *G01M 13/00* (2013.01); *E05B 37/0031* (2013.01); *E05B 65/52* (2013.01)

(58) Field of Classification Search
CPC .. G01M 13/00; G01M 99/005; G01M 99/007; G01M 99/008; G01M 99/00
(Continued)

(56) References Cited

U.S. PATENT DOCUMENTS 2,311,752 A * 2/1943 Hofmann .................. G10C 9/00
                                                  73/865.9
2,493,782 A * 1/1950 Schwarz ................ A44B 19/42
                                                       73/9
(Continued)

FOREIGN PATENT DOCUMENTS

CN          2826401 Y     10/2006
CN        201335776 Y     10/2009
(Continued)

*Primary Examiner* — Peter Macchiarolo
*Assistant Examiner* — Nathaniel Kolb
(74) *Attorney, Agent, or Firm* — Zhihua Han

(57) ABSTRACT

The invention relates to a three-in-one testing machine for a coded luggage lock. The three-in-one testing machine includes a testing machine table and a control unit. At least two coded lock fixing clamps, a code wheel code-rubbing testing mechanism and a key pulling/insertion/rotation testing mechanism are installed on a working table top of the testing machine table. In the invention, by means of the structure, two testing mechanisms on one testing machine can complete testing on three functions including the rotation life of a code wheel, key insertion/pulling to detect the fatigue strength of a lock kernel and a lock row and key rotation to detect the rotation strength of the lock kernel and the fatigue resistance of a locating pit cooperating with the lock kernel.

7 Claims, 3 Drawing Sheets

(58) Field of Classification Search
USPC .......................................................... 73/865.9
See application file for complete search history.

(56) References Cited

U.S. PATENT DOCUMENTS

| | | | | |
|---|---|---|---|---|
| 5,505,099 | A * | 4/1996 | Tanaka | A44B 19/26 |
| | | | | 73/865.9 |
| 6,189,394 | B1 * | 2/2001 | Sullivan | E05B 81/20 |
| | | | | 49/166 |
| 6,425,300 | B1 * | 7/2002 | Seo | G01M 99/008 |
| | | | | 73/865.9 |
| 7,117,715 | B2 * | 10/2006 | Soley | F15B 19/00 |
| | | | | 73/1.71 |
| 2004/0237675 | A1 * | 12/2004 | Kostenick, Jr. | G01M 99/008 |
| | | | | 73/865.9 |
| 2012/0186359 | A1 * | 7/2012 | Huang | G01M 99/007 |
| | | | | 73/856 |
| 2017/0248496 | A1 * | 8/2017 | Duan | G01M 99/005 |

FOREIGN PATENT DOCUMENTS

| | | |
|---|---|---|
| CN | 201497639 U | 6/2010 |
| CN | 201983925 U | 9/2011 |
| CN | 103411768 A | 11/2013 |
| CN | 204330318 U | 5/2015 |
| JP | 2009294085 A | 12/2009 |
| WO | WO2004001166 A1 | 12/2003 |

\* cited by examiner ated in the testing machine table, a touch display screen and a start-stop switch, the touch display screen and the start-stop switch being installed on the side of the machine table. An alarm lamp may be arranged on the side of the machine table.

THREE-IN-ONE TESTING MACHINE FOR A CODED LUGGAGE LOCK

This application is a national stage application of International application number PCT/CN2015/074168, filed Mar. 13, 2015, titled "THREE-IN-ONE TESTING MACHINE FOR A CODED LUGGAGE LOCK," which claims the priority benefit of Chinese Patent Application No. 201410855054.6, filed on Dec. 31, 2014, which is hereby incorporated by reference in its entirety.

FIELD OF THE INVENTION

The invention relates to the technical field of coded locks, and in particular to a three-in-one testing machine for a coded luggage lock.

BACKGROUND OF THE INVENTION

Currently, the rotation life of a code wheel of a luggage lock, the insertion/pulling of a key and the rotation of the key are mainly tested by a worker in a manual manner. The testing mode is very low in efficiency, low in accuracy and high in labour cost.

SUMMARY OF THE INVENTION

The invention provides a three-in-one testing machine for a coded luggage lock, which is intended to overcome the defects in the traditional art.

To this end, the technical solutions adopted in the invention are implemented as follows. A three-in-one testing machine for a coded luggage lock may include a testing machine table and a control unit. At least two coded lock fixing clamps, a code wheel code-rubbing testing mechanism and a key pulling/insertion/rotation testing mechanism may be installed on a working table top of the testing machine table.

The code wheel code-rubbing testing mechanism may include a horizontal installation seat, a motor, a crank rocker horizontally arranged on the horizontal installation seat and driven by the motor, a horizontal push rod connected to the crank rocker and driven thereby, a push rod seat configured to install and locate the horizontal push rod, and a code-rubbing block connected to the tail end of the horizontal push rod. The lower rear part of the code-rubbing block may be connected to a horizontal sliding block in a horizontal guide rail and sliding block assembly parallel to the horizontal push rod, and a horizontal guide rail may be fixed to the working table top of the testing machine table.

The key pulling/insertion/rotation testing mechanism may include a longitudinal support installed on the working table top, a longitudinal electric push rod and a longitudinal guide rail and sliding block assembly installed on the longitudinal support, a longitudinal servo motor simultaneously connected to the longitudinal electric push rod and a longitudinal sliding block in the longitudinal guide rail and sliding block assembly, and a key fixing block installed at the bottom end of an output shaft of the longitudinal servo motor, a longitudinally-disposed key locating groove being provided on the key fixing block.

A code-rubbing silicone block may be installed on a lower surface of the code-rubbing block. A code-rubbing rack which laterally protrudes may be installed on the code-rubbing block, and a gear support may be installed on the working table top correspondingly. A plurality of longitudinal gear shafts may be installed on the gear support via bearings. A gear and a code-rubbing silicone ring may be installed at the middle lower part of each longitudinal gear shaft sequentially. Each gear may be engaged with the code-rubbing rack.

The control unit may include a Programmable Logic Controller (PLC) arranged in the testing machine table, a touch display screen and a start-stop switch, the touch display screen and the start-stop switch being installed on the side of the machine table. An alarm lamp may be arranged on the side of the machine table.

A code-rubbing strength sensor connected to the PLC of the control unit may be arranged in the code wheel code-rubbing testing mechanism.

A pulling/insertion strength sensor and a torsion strength sensor connected to the PLC of the control unit may be arranged in the key pulling/insertion/rotation testing mechanism.

A first photoelectric switch and a second photoelectric switch connected to the PLC may be arranged on the working table top of the testing machine table and beside the coded lock fixing clamps respectively.

A plurality of fixing holes may be provided on the working table top of the testing machine table so as to install all mechanisms and adjust the positions of all mechanisms according to the conditions such as the type of a lock to be tested and a position requirement respectively.

In the invention, by means of the structure, two testing mechanisms on one testing machine can complete testing on three functions including the rotation life of a code wheel, key insertion/pulling to detect the fatigue strength of a lock kernel and a lock row and key rotation to detect the rotation strength of the lock kernel and the fatigue resistance of a locating pit cooperating with the lock kernel. Moreover, the two testing mechanisms may operate synchronously or asynchronously, and independent control, convenience and flexibility are achieved. The conventional manual testing is replaced with the testing machine, thereby greatly improving the efficiency and reducing the labour cost. The testing accuracy and the testing consistency are improved, and improvement of the quality of a product is promoted. Moreover, testing of the testing machine can be applied to locks including front-layout luggage locks, side-layout luggage locks and padlocks; testing on key insertion/pulling and testing on key rotation may include testing on zipper locks, padlocks and side locks; and the application range is wide, a failure alarm function is provided, and complete intelligence is achieved.

DETAILED DESCRIPTION OF THE PREFERRED EMBODIMENTS

The invention is further described below with reference to the embodiments and the drawings.

Figure 1:
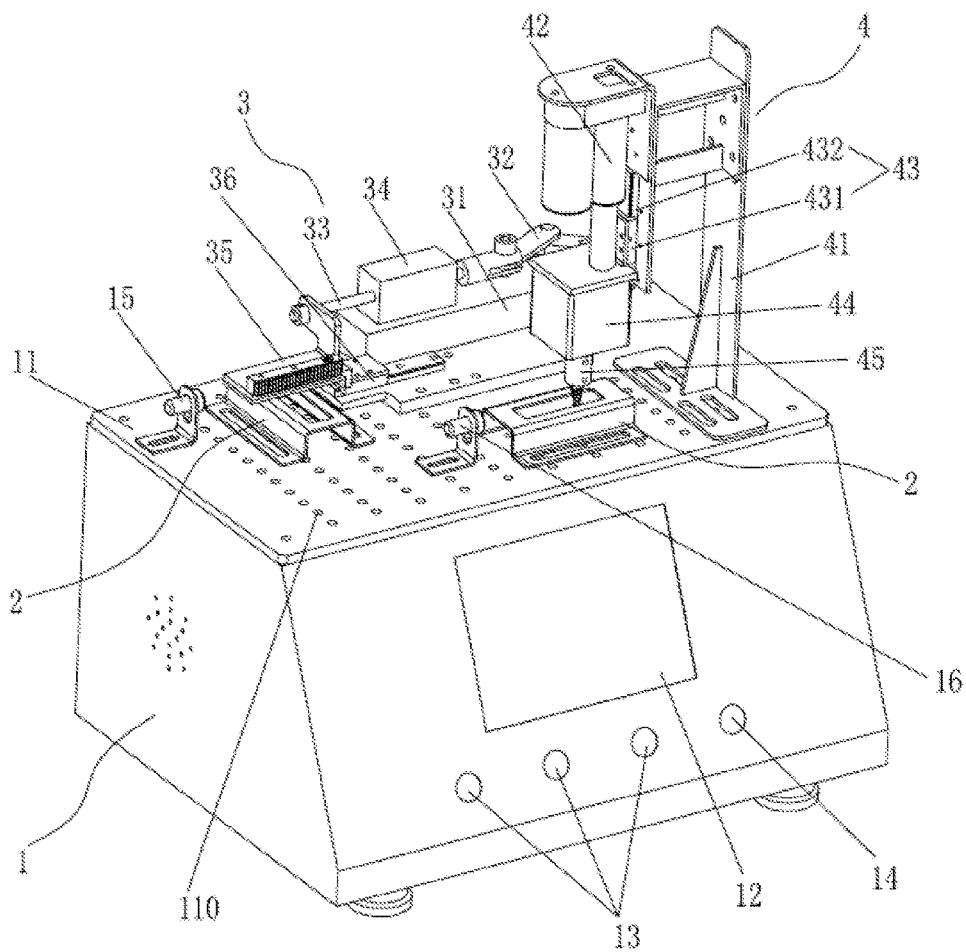
FIG. 1 and FIG. 2 are overall structure diagrams of a testing machine according to the invention.
Figure 2:
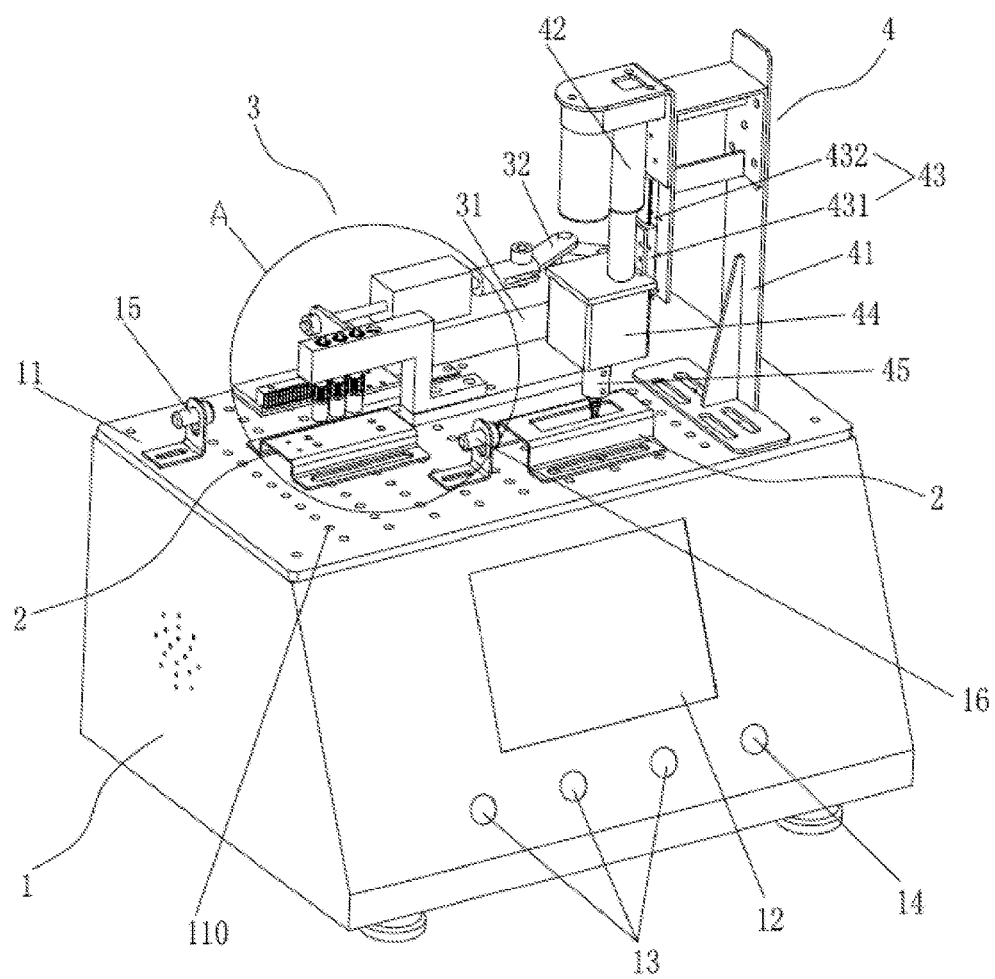
Figure 3:
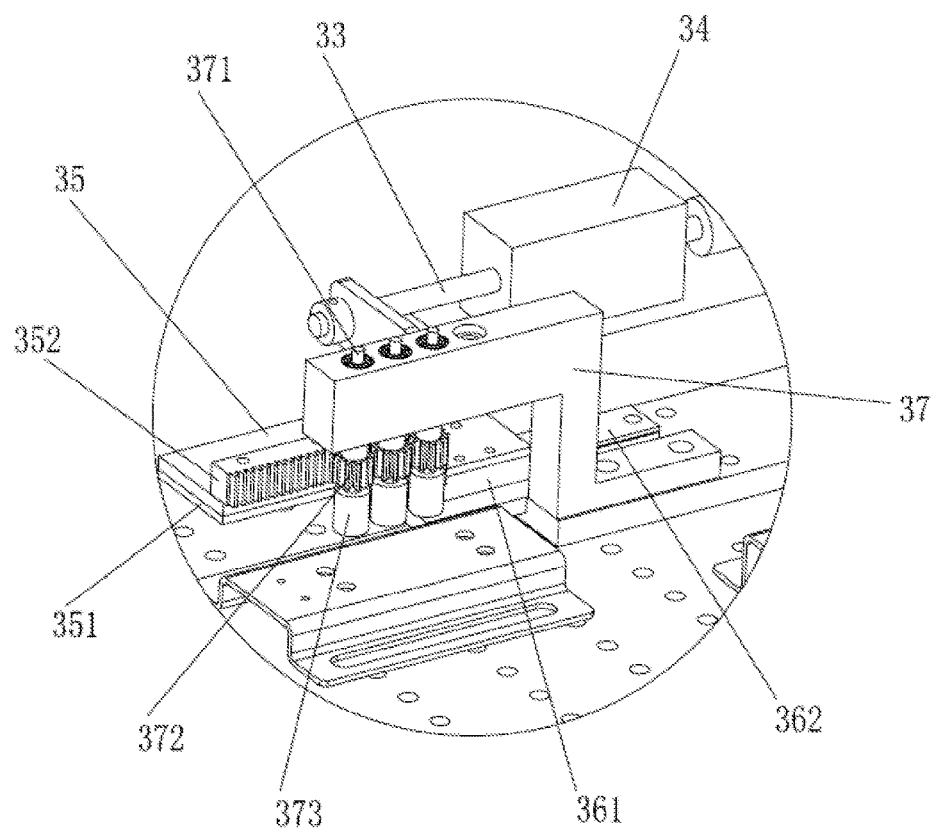
FIG. 3 is a detail view of a part A in FIG. 2.

As shown in FIG. 1 to FIG. 3, the invention provides a three-in-one testing machine for a coded luggage lock, which includes a testing machine table 1 and a control unit. A plurality of fixing holes 110 are provided on a working table top 11 of the testing machine table 1. At least two coded lock fixing clamps 2, a code wheel code-rubbing testing mechanism 3 and a key pulling/insertion/rotation testing mechanism 4 are installed on the working table top 11 of the testing machine table 1.

The code wheel code-rubbing testing mechanism 3 includes a horizontal installation seat 31, a motor (arranged inside the horizontal installation seat or the testing machine and not shown in Figure), a crank rocker 32 horizontally arranged on the horizontal installation seat 31 and driven by the motor, a horizontal push rod 33 connected to the crank rocker 32 and driven thereby, a push rod seat 34 configured to install and locate the horizontal push rod 33, and a code-rubbing block 35 connected to the tail end of the horizontal push rod 33. A working part of the code-rubbing block 35 is located laterally below the axial direction of the horizontal push rod 33. The lower rear part of the code-rubbing block 35 is connected to a horizontal sliding block 361 in a horizontal guide rail and sliding block assembly 36 parallel to the horizontal push rod 33, and a horizontal guide rail 362 is fixed to the working table top 11 of the testing machine table 1. The crank rocker 32 is driven by the motor, drives the horizontal push rod 33 to move back and forth along the push rod seat 34, and further drives the code-rubbing block 35 to reciprocate along the horizontal guide rail 362. One or two of the coded lock fixing clamps 2 are located below or laterally below the code-rubbing block 35. The code-rubbing block 35 drives a code wheel on a coded lock to rotate back and forth so as to test the life of the code wheel.

Furthermore, a code-rubbing silicone block 351 is installed on a lower surface of the code-rubbing block 35. The code-rubbing block 35 reciprocates under the driving of the horizontal push rod 33 entirely to drive the code wheel to rotate by means of the friction between the code-rubbing silicone block 351 on the lower surface and the code wheel, thereby being applicable to testing a coded lock in a type that a code wheel protrudes on an upper surface of a lock box. A code-rubbing rack 352 which laterally protrudes is installed on the code-rubbing block 35, and a gear support 37 is installed on the working table top 11 correspondingly. The gear support 37 is bent. A plurality of longitudinal gear shafts 371 are installed on the gear support 37 via bearings. A gear 372 and a code-rubbing silicone ring 373 are installed at the middle lower part of each longitudinal gear shaft 371 sequentially. Each gear 372 is engaged with the code-rubbing rack 352. By engaging the rack 352 with the gears 372, when the rack 352 reciprocates along with the code-rubbing block 35, the gears 372 and the gear shafts 371 are driven to rotate, thereby allowing the code-rubbing silicone rings 373 fixed to the bottom ends of the gear shafts 371 rotate. A mode of driving the code wheel to rotate by means of the friction between the code-rubbing silicone rings 373 and the code wheel is suitable for testing a coded lock in a type that a code wheel laterally protrudes on a lock box. Thus, the structure cooperates with the corresponding coded lock fixing clamps, so that various types of coded locks can be tested, or even the rotation lives of the code wheels of two coded locks can be tested simultaneously by slight adjustment of a specific position and a specific size. The reciprocation for one time is a testing period. According to a testing requirement, a choice to integrally install the gear support 37 and components thereon or not can be made.

The key pulling/insertion/rotation testing mechanism 4 includes a longitudinal support 41 installed on the working table top 11, a longitudinal electric push rod 42 and a longitudinal guide rail and sliding block assembly 43 installed on the longitudinal support 41, a longitudinal servo motor 44 simultaneously connected to the longitudinal electric push rod 42 and a longitudinal sliding block 431 in the longitudinal guide rail and sliding block assembly 43, and a key fixing block 45 installed at the bottom end of an output shaft of the longitudinal servo motor 44, a longitudinally-disposed key locating groove being provided on the key fixing block 45. The key locating groove cooperates with a radial locking screw to fix a key. One of the coded lock fixing clamps 2 is located right below the key fixing block 45, so that a lock hole directly faces the key installed on the key fixing block after the coded lock is fixed. The longitudinal electric push rod 42 drives the whole longitudinal servo motor 44 to move up and down along a longitudinal guide rail 432 in the longitudinal guide rail and sliding block assembly 43, so that the key installed on the output shaft of the longitudinal servo motor 44 moves up and down, and testing on key pulling/insertion is performed. After the key is inserted into the lock hole of the coded lock, the longitudinal servo motor 44 works, so that the output shaft and the key thereon rotate forward for 90 degrees accordingly and then rotate backward for 90 degrees, the key is tested, and a testing period ranges from insertion of the key, forward rotation, backward rotation to pull-out of the key.

The control unit includes a PLC (not shown in Figure) arranged in the testing machine table 1, a touch display screen 12 and a start-stop switch 13, the touch display screen 12 and the start-stop switch 13 being installed on the side of the machine table. An alarm lamp 14 is arranged on the side of the machine table.

A code-rubbing strength sensor connected to the PLC of the control unit is arranged in the code wheel code-rubbing testing mechanism 3. The code-rubbing strength sensor can sense a code-rubbing strength namely the size of a code-rubbing resistance. The code-rubbing strength is compared with a code-rubbing strength range threshold (generally input as a minimum value 0.1 kgf and a maximum value 0.3 kgf) set in the PLC. When the code-rubbing strength is within this range, it is shown that the code-rubbing strength is normal, namely the code wheel rotates normally. When the code-rubbing strength is too large or small to be within this range, it is shown that the movement of the code wheel is blocked or the rotation is over-relaxed, the code wheel rotates abnormally, and it is shown that the code wheel has failed. At this time, the PLC controls an acousto-optic alarm apparatus to give an alarm so as to remind an operator of ending of code-rubbing testing on the code wheel.

A pulling/insertion strength sensor and a torsion strength sensor connected to the PLC of the control unit are arranged in the key pulling/insertion/rotation testing mechanism 4. The pulling/insertion strength sensor senses the thrust strength needed by insertion of the key into a lock cylinder in a pulling/insertion process and the pull force strength needed by pull-out or the size of a resistance to be overcome. The pulling/insertion strength is compared with a pulling/insertion strength range threshold (generally input as a minimum value 0.1 kgf and a maximum value 0.5 kgf) set in the PLC. When the pulling/insertion strength is within this range, it is shown that the pulling/insertion strength is normal. When the pulling/insertion strength is too large or small to be within this range, it is shown that the fatigue strength of a lock kernel and a lock row of the lock cylinder is abnormal, and testing needs to be ended. Correspondingly, the torsion strength sensor senses the torsion strength needed in a torsion process of the key. Likewise, the torsion strength is compared with a torsion strength range threshold (generally input as a minimum value 0.2 kgf and a maximum value 0.5 kgf) set in the PLC. When the torsion strength is within this range, it is shown that the torsion strength is normal. When the torsion strength is too large or small to be within this range, it is shown that the rotation strength of the lock kernel and the fatigue resistance of a locating pit cooperating with the lock kernel are abnormal, and testing also needs to be ended.

The code-rubbing strength sensor, the pulling/insertion strength sensor and the torsion strength sensor can perform threshold setting in the PLC, and can set each threshold according to standards of different enterprises and different types of locks so as to more flexibly and intelligently detect various locks.

A first photoelectric switch 15 and a second photoelectric switch 16 connected to the PLC are arranged on the working table top 11 of the testing machine table 1 and beside the coded lock fixing clamps 2 respectively. The first photoelectric switch 15 is opposite to the code-rubbing block 35, can calculate the number of times for reciprocation of the code-rubbing block 35, and can also detect whether the code-rubbing block 35 operates normally. When the code-rubbing block stays still in an operation process in case of a mechanical fault, the first photoelectric switch 15 sends a signal to the PLC to further allow the acousto-optic alarm to give an alarm. The second photoelectric switch 16 is opposite to a falling position of the key, calculates the number of times for testing key pulling/insertion, and detects whether the longitudinal electric push rod 42 and the longitudinal servo motor 44 operate normally. If the longitudinal electric push rod 42 and the longitudinal servo motor 44 stop operating in case of a fault, the second photoelectric switch 16 sends a signal to the PLC to further allow the acousto-optic alarm to give an alarm.

When the three-in-one testing machine for a coded luggage lock is used, it is necessary to execute the steps as follows.

1) A lock needing to be tested is installed, and a testing position is debugged.

2) A power supply is started.

3) A user enters a human-computer interface and sets each testing parameters.

4) A start button is pressed down on the human-computer interface.

5) The start button is divided into a code-rubbing testing start button and a key testing start button.

6) The key testing start button is pressed down.

7) An electric push rod moves downward, a key is inserted into a lock hole, and after a maximum downward-movement stroke is reached, the electric push rod stops.

8) A stepping motor is started, rotates forward for 90 degrees, and then stops.

9) The electric push rod lifts, the key is pulled out, after a maximum lifting stroke is reached, the step stops temporarily for 0.5 s, then the electric push rod moves downward, the key is inserted into the lock hole, and after the maximum downward-movement stroke is reached, the electric push rod stops.

10) The stepping motor is started, rotates backward for 90 degrees, and then stops.

11) Steps 7 to 10 are cyclically executed, and after continuing for 1500 times, the operation stops, and an alarm is given. Meanwhile, in the operation process, when the rotation torsion of the key is over-large or over-small, which is determined by programming inside a PLC and generally input as a minimum value 0.2 kgf and a maximum value 0.5 kgf, the PLC controls an acousto-optic alarm to give an alarm, and all tests are stopped. Meanwhile, when the insertion thrust or pull-out force of the key is over-small or over-large, which is determined by programming inside the PLC and generally input as a minimum insertion thrust value 0.1 kgf and a maximum insertion thrust value 0.5 kgf or a minimum pull-out force value 0.2 kgf and a maximum pull-out force value 0.5 kgf, the PLC controls the acousto-optic alarm to give an alarm, and all tests are stopped.

12) The code-rubbing testing start button is pressed down.

13) A crank rocker mechanism drives a code-rubbing plate and a code-rubbing wheel to work back and forth to achieve 5000 cycles. When the code-rubbing force is over-large or over-small, which is determined by programming inside the PLC and generally input as a minimum value 0.1 kgf and a maximum value 0.3 kgf, the PLC controls the acousto-optic alarm to give an alarm, and all tests are stopped.

14) When parameters set by the human-computer interface are reached during testing, the machine automatically stops, and gives an alarm.

In the invention, by means of the structure, two testing mechanisms on one testing machine can complete testing on three functions including the rotation life of the code wheel, key insertion/pulling to detect the fatigue strength of the lock kernel and the lock row and key rotation to detect the rotation strength of the lock kernel and the fatigue resistance of the locating pit cooperating with the lock kernel. Moreover, the two testing mechanisms may operate synchronously or asynchronously, and independent control, convenience and flexibility are achieved. The conventional manual testing is replaced with the testing machine, thereby greatly improving the efficiency and reducing the labour cost. The testing accuracy and the testing consistency are improved, and improvement of the quality of a product is promoted.

Moreover, testing of the testing machine can be applied to locks including front-layout luggage locks, side-layout luggage locks and padlocks; testing on key insertion/pulling and testing on key rotation may include testing on zipper locks, padlocks and side locks; and the application range is wide. Meanwhile, simulation of the working sequence and principle of the luggage lock under the using condition controlled by the PLC is achieved, the three functions can be tested sequentially every 3 seconds, and compared with the current manual testing efficiency, the testing efficiency is increased by over 20 times; and in addition, testing may include single-item testing and multi-item testing, and can be self-adjusted. The invention is adaptable to all luggage locks, padlocks and side locks on the current market. A failure alarm function is provided, and complete intelligence is achieved.

What is claimed is:

1. A three-in-one testing machine for a coded luggage lock, comprising a testing machine table and a control unit, wherein at least two coded lock fixing clamps, a code wheel code-rubbing testing mechanism and a key pulling/insertion/rotation testing mechanism are installed on a working table top of the testing machine table;

the code wheel code-rubbing testing mechanism comprises a horizontal installation seat, a motor, a crank rocker horizontally arranged on the horizontal installation seat and driven by the motor, a horizontal push rod connected to the crank rocker and driven thereby, a push rod seat configured to install and locate the horizontal push rod, and a code-rubbing block connected to the tail end of the horizontal push rod, the lower rear part of the code-rubbing block being connected to a horizontal sliding block in a horizontal guide rail and sliding block assembly parallel to the horizontal push rod, and a horizontal guide rail being fixed to the working table top of the testing machine table; and the key pulling/insertion/rotation testing mechanism comprises a longitudinal support installed on the working table top, a longitudinal electric push rod and a longitudinal guide rail and sliding block assembly installed on the longitudinal support, a longitudinal servo motor simultaneously connected to the longitudinal electric push rod and a longitudinal sliding block in the longitudinal guide rail and sliding block assembly, and a key fixing block installed at the bottom end of an output shaft of the longitudinal servo motor, a longitudinally-disposed key locating groove being provided on the key fixing block.

2. The three-in-one testing machine for a coded luggage lock according to claim 1, wherein a code-rubbing silicone block is installed on a lower surface of the code-rubbing block; a code-rubbing rack which laterally protrudes is installed on the code-rubbing block, and a gear support is installed on the working table top correspondingly; a plurality of longitudinal gear shafts are installed on the gear support via bearings; a gear and a code-rubbing silicone ring are installed at the middle lower part of each longitudinal gear shaft sequentially; and each gear is engaged with the code-rubbing rack.

3. The three-in-one testing machine for a coded luggage lock according to claim 1, wherein the control unit comprises a Programmable Logic Controller (PLC) arranged in the testing machine table, a touch display screen and a start-stop switch, the touch display screen and the start-stop switch being installed on the side of the machine table, and an alarm lamp being arranged on the side of the machine table.

4. The three-in-one testing machine for a coded luggage lock according to claim 1, wherein a code-rubbing strength sensor connected to the PLC of the control unit is arranged in the code wheel code-rubbing testing mechanism.

5. The three-in-one testing machine for a coded luggage lock according to claim 1, wherein a pulling/insertion strength sensor and a torsion strength sensor connected to the PLC of the control unit are arranged in the key pulling/insertion/rotation testing mechanism.

6. The three-in-one testing machine for a coded luggage lock according to claim 1, wherein a first photoelectric switch and a second photoelectric switch connected to the PLC are arranged on the working table top of the testing machine table and beside the coded lock fixing clamps respectively.

7. The three-in-one testing machine for a coded luggage lock according to claim 1, wherein a plurality of fixing holes are provided on the working table top of the testing machine table.

* * * * *